UNITED STATES PATENT OFFICE.

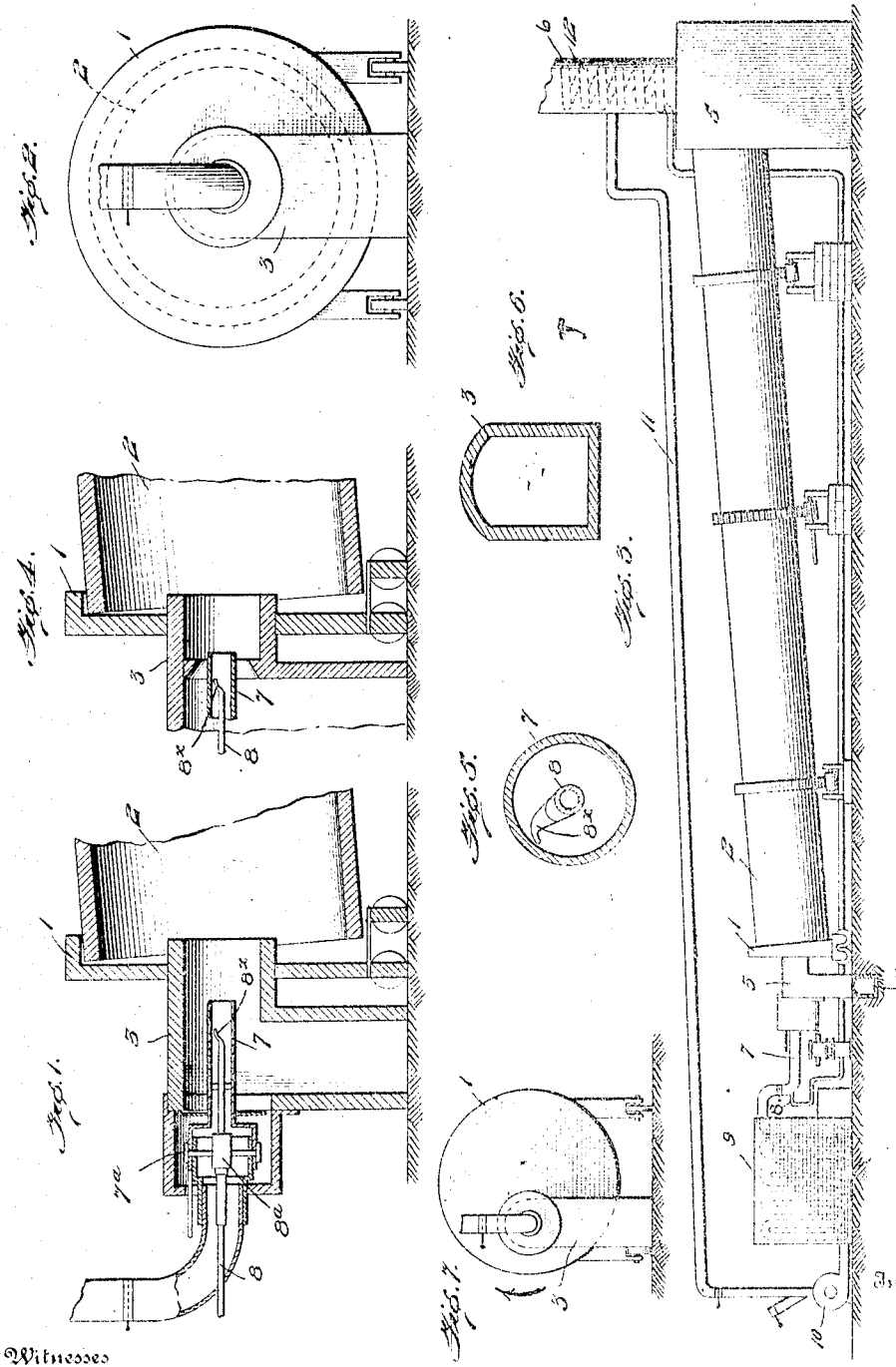

CARLETON ELLIS, OF WHITE PLAINS, NEW YORK.

ROTARY KILN.

No. 887,318.

Specification of Letters Patent.

Patented May 12, 1908.

Application filed October 31, 1905. Serial No. 285,265.

*To all whom it may concern:*

Be it known that I, CARLETON ELLIS, a citizen of the United States, and a resident of White Plains, in the county of Westchester and State of New York, have invented certain new and useful Improvements in Rotary Kilns, of which the following is a specification.

This invention relates to gas burners for the combustion of producer gas in its application as a fuel for the burning of cement. The ordinary forms of gas ports heretofore tried for this purpose have not proven satisfactory owing to the inability to properly direct the flame and control the rate of combustion. Producer gas being an exceedingly dilute form of fuel, great volumes of it are required to heat a rotary cement kiln with correspondingly large-orificed burners and for this reason, and for the reason that if used as hot as it leaves the producer the employment of high pressure pumping machinery is almost precluded, it is very difficult to cause it to burn within the kiln in a positive, well-developed flame.

For the burning of cement a very rapid rate of combustion is necessary and as a high temperature is required in the lower part of the kiln where the clinkering operation is performed ordinary methods of mixing air and gas are poorly suited for application to the burning of producer gas for the manufacture of cement, in as much as the rapid mixture and development of high temperatures is not easily secured.

This invention has for its object an apparatus so constructed that a positive, uniform, dirigible flame of high heat intensity may be secured with producer gas without difficulty.

In the accompanying diagrammatic drawings Figure 1 represents a section of the apparatus or burner. Fig. 2 is an end elevation showing the connections with the hood or head of the kiln and Fig. 3 represents a longitudinal view of the burner and kiln. Fig. 4 is a view similar to Fig. 1, illustrating an alternative form of draft nozzle. Fig. 5 shows, on a larger scale, a transverse section of the draft nozzle of Fig. 1. Fig. 6 shows a transverse section of an alternative form of gas port. And Fig. 7 is a view similar to Fig. 2, illustrating the setting of the air and gas inlets to one side of the axis, to cause the flame to impinge upon the cement material clinging to the up-turning side of the kiln.

Like reference characters designate like parts in the several figures.

Referring to Fig. 1, 1 is a hood or "header" closing the end of the kiln 2.

3 is the gas port supplied with gas from the underground conduit 4 shown in Fig. 3.

5 is the housing or dust chamber inclosing the upper end of the kiln, on which housing is situated the stack 6. In the gas port 3 is situated the air supply pipe 7 through which preferably low pressure air as from a centrifugal blower is supplied.

8 is a pipe or jet through which compressed air may be admitted. It is preferably placed inside the pipe 7 and is preferably given a bend of such direction, at a point such as $8^x$, so that the jet of air formed issues in an oblique non-radial direction with respect to the axis of pipe 7, so that the blast of air in the pipe 7 is given a rotary motion as it discharges into the gas port 3. The passage 7 as shown is not introduced so far into the gas port as to project into the kiln but is preferably situated back in the port at a short distance from the outlet of the latter.

9 is a stove for preheating the air employed and 10 is a fan supplying the necessary air required for combustion, except such as is admitted through the jet 8 or enters through the clinker discharge passages or by infiltration.

The operation of my apparatus is as follows:—Assuming that the kiln is started from the cold condition, a wood fire is built in its lower end, and when it is well heated gas is admitted through the port 3. The fan 10 is then put in motion, forcing a blast of air through the stove 9 and discharging it through the pipe 7. The air and gas ignite at the mouth of the gas port and burn with a flame of high heat intensity. The compressed air is admitted in suitable amount through jet 8 to secure the necessary admixture of the gas and to assist in directing the flame to the point where the heat must be generated most rapidly. The pipes 7 and 8 are hinged, at $7^a$ and $8^a$ respectively, as shown in Fig. 1, so that their end portions, being dirigible, may be moved or directed to give the flame its most effective location. The compressed air jet acts inductively, drawing air through the pipe 7 and thereby assisting the fan 10 which may be run at a lesser presser than would be otherwise required. The fan 10 may be employed to supply a blast of pure air or of one containing products of combustion or air in predetermined amount according to the quality of the flame desired. In Fig. 3 I show a valved pipe 11 connecting the intake of the fan to stack 6, for mixing products of combustion with the entering air current. Products of combustion added in small quantity to the air supply reduce the tendency to the formation of rings in the kiln.

In place of the inductive jet 8 I have used a specially constructed form of jet blower, shown in Fig. 4, constricted around the jet, which exerts a greater inductive action than the jet in a tube of even bore is capable of effecting. The efficient induction so produced is desirable, I have found, in certain forms of preheating stoves owing to the loss in velocity of the air blast in traveling through the tortuous passages of the preheating stove. I have found that with apparatus somewhat similar to that here illustrated that the fan 10 when operated to give a pressure of 7½" of water at its outlet affords at the opposite end of the stove a pressure of only 1 1/4", so great is the friction loss of the air in traversing the stove. By means of the inductive jet the pressure is increased at the kiln and the velocity required is more easily secured. I have found that high velocity of delivery of air into the kiln is very desirable and in one instance I found that 17" to 18" of pressure as shown by the water gage in conjunction with auxiliary supply of compressed air afforded better results than where pressures of 2" and 3" were employed.

As indicated in the drawing, the gas port is preferably circular in its cross section at its discharge end, but I have found other forms or shapes for the discharge opening to be also efficient; as for instance the square port with arched roof, shown in Fig. 6. The diameter of the pipe 7 must not be so great as to block the passage of gas in the port 3, neither should the discharge end of the pipe be placed so far back in the port 3 as to exert a choking action by virtue of combustion occurring in the port itself to an appreciable extent. The diameter of the pipe 7 will also vary with the blast pressure employed. With a gas port 23" in diameter I have found an 8" pipe to work well for the air supply when the air was preheated to 350° and was introduced at a pressure of about 3" by the water gage. In another instance with a port 20" in diameter for the gas and with an air blast pipe of only 4" but with a fan pressure of 17" I secured a concentrated flame which gave the localized heat especially suited for the production of clinker.

The high and low pressure air used with this apparatus may be preheated in any suitable manner. To this end I have shown a separately fired stove 9 for heating the low pressure air, and coils 12 in stack 6 for heating the high pressure air. To secure the best results the gas should be conducted from the generator to the kiln in such a way that the radiation loss is kept as low as possible.

The gas and air ports are preferably located as shown in the drawing—that is to say so directed as to produce a flow of gas into the kiln near its axis. I have also found it possible to set the port either to the left or right of the center, depending upon the direction of rotation of the kiln, so that the flame instead of burning axially in the kiln will impinge upon the material, thereby generating the heat at the point of its absorption. This is illustrated in Fig. 7, in which figure the gas and air inlets are shown to the left of the axis of the kiln, rotation being upward on such left-hand side, as indicated by the arrow, so that the flame will impinge on the cement material which, by clinging to the side of the kiln, is carried upward a short distance on the up-turning side of the kiln. This is specially desirable when the air employed has not been preheated.

What I claim is:—

1. The combination with a horizontal inclined kiln, of a source of heating gas, and a gas burner therefor comprising a gas port arranged to direct gas into said kiln and having within it low pressure and high pressure air passages arranged one within the other.

2. The combination with a horizontal inclined kiln, of a source of heating gas and a gas burner therefor comprising a gas port arranged to direct gas into said kiln and having within it low pressure and high pressure air passages arranged one within the other, and means for heating the low pressure air.

3. The combination with a horizontal inclined kiln, of a source of heating gas and a gas burner therefor comprising a gas port arranged to direct gas into said kiln and having within it low pressure and high pressure air passages arranged one within the other, and means for heating both the low pressure and the high pressure air.

4. The combination with a horizontal inclined kiln, of a source of heating gas and a gas burner therefor comprising a gas port arranged to direct gas into said kiln and having within it low pressure and high pressure air passages arranged one within the other, said burner comprising means for directing the flame at will.

5. The combination with a horizontal inclined kiln, of a source of heating gas and a gas burner therefor comprising a gas port arranged to direct gas into said kiln and having within it low pressure and high pressure air passages arranged one within the other, and comprising dirigible end sections.

6. The combination with a horizontal inclined kiln, of a source of heating gas and a gas burner therefor comprising a gas port arranged to direct gas into said kiln and having within it low pressure and high pressure air passages arranged one within the other, said burner comprising means for imparting rotary motion to the low pressure air jet.

7. The combination with a horizontal inclined kiln, of a source of heating gas and a gas burner therefor comprising a gas port arranged to direct gas into said kiln and having within it low pressure and high pressure air passages arranged one within the other, said high-pressure passage provided with means for imparting rotary motion to the low pressure air jet.

8. The combination with a horizontal inclined kiln, of a source of heating gas and a gas burner therefor comprising a gas port arranged to direct gas into said kiln and having within it low pressure and high pressure air passages, the high pressure passage within the low pressure passage and having an end portion projecting angularly and non-radially with respect to the axis of said low pressure passage, whereby rotation of the low pressure air jet is produced.

Signed at New York, in the county of New York, and State of New York, this 25th day of October, A. D. 1905.

CARLETON ELLIS.

Witnesses:
FLETCHER P. SCOFIELD,
FRED A. CHAMBERLAIN.